UNITED STATES PATENT OFFICE.

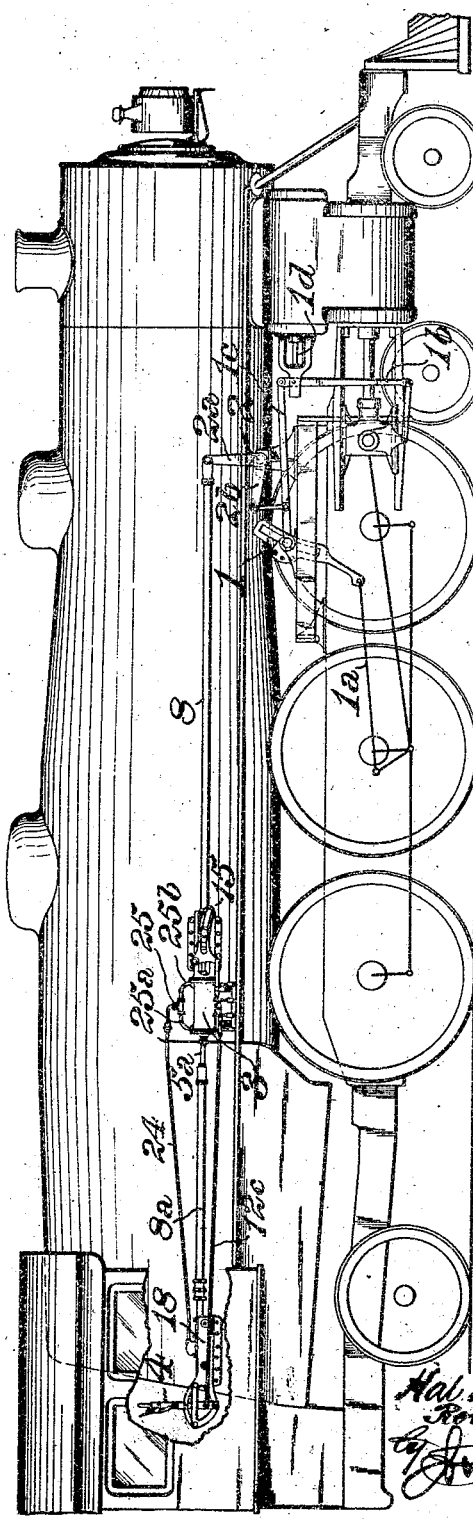

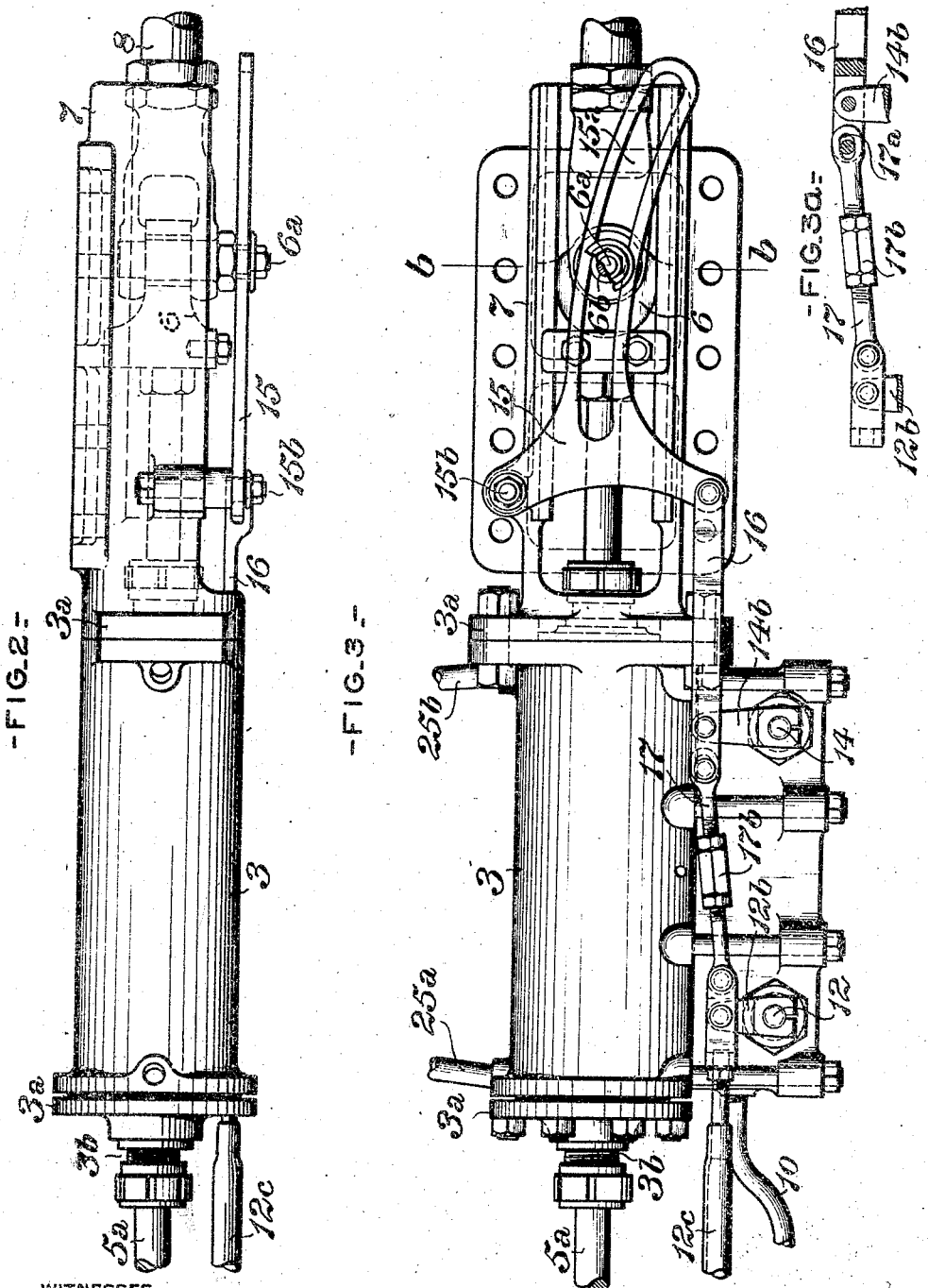

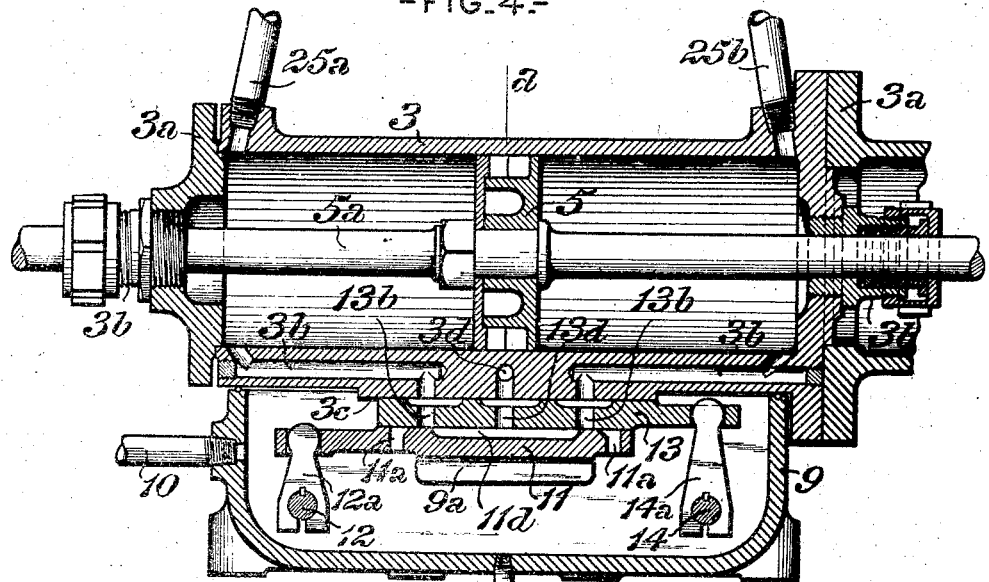

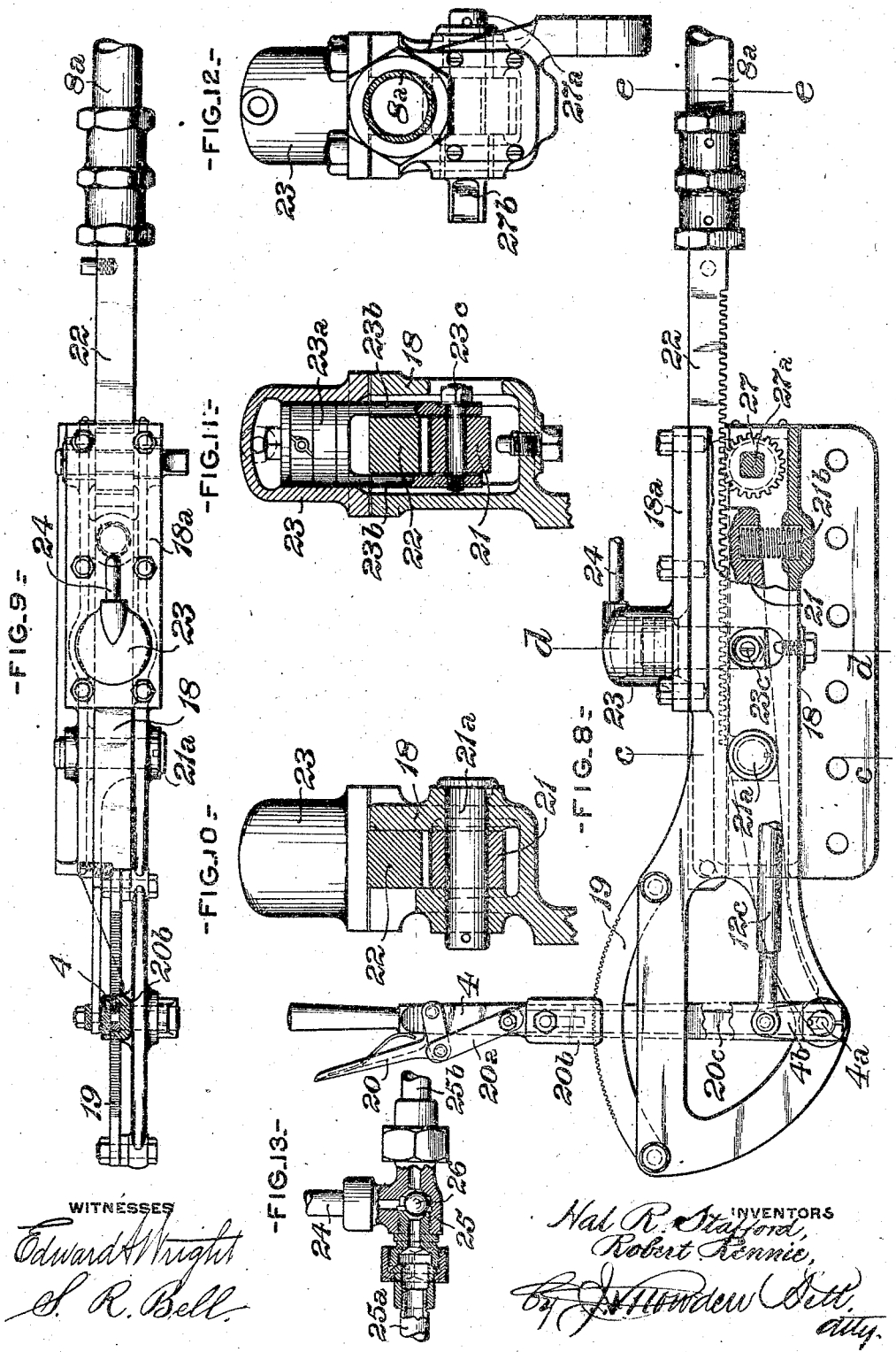

HAL R. STAFFORD, OF PLAINFIELD, NEW JERSEY, AND ROBERT RENNIE, OF SCHENECTADY, NEW YORK.

STEAM-ENGINE VALVE-REVERSING GEAR.

1,077,862.   Specification of Letters Patent.   Patented Nov. 4, 1913.

Application filed June 30, 1913.   Serial No. 776,496.

*To all whom it may concern:*

Be it known that we, HAL R. STAFFORD, of Plainfield, in the county of Union and State of New Jersey, and ROBERT RENNIE, of Schenectady, in the county of Schenectady and State of New York, have jointly invented a certain new and useful Improvement in Steam-Engine Valve-Reversing Gear, of which improvement the following is a specification.

The object of our invention is to provide a steam engine valve reversing gear, designed more particularly for application in locomotive engines, which shall be of simple, compact, and inexpensive construction, and in the operation of which close adjustment and great steadiness of the controlled valve gear shall be insured by the reduction, to the minimum degree practicable, of the required movement of the operating mechanism.

The improvement claimed is hereinafter fully set forth.

In the accompanying drawings: Figure 1 is a side view, in elevation, of a locomotive engine, illustrating the application of our invention in connection with a Walschaert valve gear; Fig. 2, a plan or top view of the reversing cylinder and its accessories; Fig. 3, a side view, in elevation, of the same; Fig. 3$^a$, a similar view, on an enlarged scale, of the link connecting the valve and valve seat rocker arms; Fig. 4, a vertical longitudinal central section through the reversing cylinder; Fig. 5, an end view, in elevation of the same; Fig. 6, a transverse section, on the line *a a* of Fig. 4; Fig. 7, a similar section, on the line *b b* of Fig. 3; Fig. 8, a side view, in elevation, of the manually actuated controlling and locking mechanism; Fig. 9, a plan or top view of the same; Figs. 10, 11, and 12, vertical transverse sections, on a larger scale, through the same, on the lines *c c*, *d d*, and *e e*, respectively of Fig. 8; and Fig. 13, a longitudinal section through the casing of the automatic three way valve.

Referring to the drawings, our invention, which is applicable in connection with any of the various known types of distribution valve mechanism, is illustrated in Fig. 1, as applied for the control of a Walschaert valve gear of the ordinary construction, which comprises a link, 1, eccentric rod, 1$^a$, combination lever, 1$^b$, and radius bar, 1$^c$, and is coupled to a distribution valve stem, 1$^d$. The radius bar is coupled to the lower arm, 2$^b$, of a reverse shaft, 2, and is raised and lowered throughout its range of traverse on the link, 1, by our improved reversing mechanism, hereinafter described, which is coupled to the upper arm, 2$^a$, of the reverse shaft.

In the practice of our invention, we provide a fluid pressure reversing cylinder, 3, which is located as nearly as practicable to the valve gear which is to be controlled, and therefore at a substantial distance from the cab of the locomotive, in which a hand reverse lever, 4, is suitably mounted. The cylinder, 3, is fitted with a properly packed piston, 5, fixed on a piston rod, 5$^a$, which passes through stuffing boxes, 3$^b$, in the heads, 3$^a$, of the cylinder. A cross head, 6, which is fitted to slide in a fixed guide, 7, is secured to the forward end of the piston rod, said cross head carrying a pin, 6$^a$, which is coupled by a reach rod, 8, to the upper arm, 2$^a$, of the reverse shaft. The rear end of the piston rod is connected, by a reach rod, 8$^a$, to a member of the manually operable actuating and locking mechanism, as hereinafter to be described.

A valve chest, 9, is secured to the lower side of the reversing cylinder, 3, said chest communicating through a supply pipe, 10, with a reservoir of compressed air or other source of fluid pressure supply, and being fitted with a drain pipe, 10$^a$, controlled by a suitable valve. Induction ports, 3$^b$, 3$^b$, lead from opposite ends of the reversing cylinder to a valve face, 3$^c$, and an intermediate exhaust port, 3$^d$, leads from said valve face to the atmosphere. The admission and exhaust of motive fluid to and from the reversing cylinder are effected and controlled by an actuating valve, 11, which is supported on guides, 9$^a$, in the valve chest, and is reciprocated thereon by the hand lever, 4, in the cab, to which it is connected through a rocker shaft, 12, which is journaled in the valve chest, and carries two arms, 12$^a$, 12$^b$. The upper end of the arm, 12$^a$, which is located within the valve chest, engages a slot in the valve, 11, and is formed with curved faces to permit its free vibratory movements, and the arm, 12$^b$, which is located outside the valve chest, is coupled by a rod, 12$^c$, to the hand lever, 4. Induction ports, 11$^a$, 11$^a$, and an exhaust cavity, 11$^d$, are formed in the actuating valve, 11.

A floating valve seat, 13, is interposed between the actuating valve, 11, and the cylinder valve face, 3$^c$, said floating valve seat having ports, 13$^b$, 13$^b$, and 13$^d$, extending through it, said ports being elongated on the side of the valve seat which abuts against the cylinder valve face, 3$^c$, so that, in all positions into which the floating valve seat may be moved, each of the ports, 13$^b$, will be in communication with one of the cylinder induction ports, 3$^b$, and the port, 13$^d$, will be in communication with the cylinder exhaust port, 3$^d$. The floating valve seat is reciprocated on the valve face, 3$^c$, by the movements of the piston, 5, of the reversing cylinder, through the intermediation of a rocker shaft, 14, journaled in the valve chest, and having an arm, 14$^a$, extending upwardly therein and engaging the floating valve seat, similarly to the rocker arm, 12$^a$, of the actuating valve, and an arm, 14$^b$, located exterior to the chest. The rocker shaft is swung in its bearings by the cross head, 6, of the reversing cylinder piston rod, 5$^a$, the pin, 6$^a$, of which cross head carries a roller, 6$^b$, fitting a longitudinally curved slot, 15$^a$, in an arm of a cam lever, 15, which is pivoted, by a pin, 15$^b$, to the fixed guide, 7, and is provided with a downwardly projecting arm which is coupled, by a rod, 16, to the arm, 14$^b$, of the rocker shaft, 14. By means of the cam lever, 15, and its connections, it will be seen that the traverse of the rocker shaft, 14, and consequently that of the floating valve seat, 13, is materially reduced, relatively to that of the piston of the reversing cylinder. The outside rocker arms, 12$^b$, of the actuating valve, and, 14$^b$, of the floating valve seat, are coupled by a link, 17, so as to limit the movement of the valve relatively to that of the valve seat, a longitudinal slot, 17$^a$, the length of which is determined by experiment, being formed in the link, for the passage of the pin by which it is coupled to the rocker arm, 14$^b$. The link is also provided with a turnbuckle, 17$^b$, for the purpose of equalizing the speed in both directions, in the event of the engine valve gear moving more rapidly in one direction than in the other, as is ordinarily the case.

The manually operable reversing mechanism and the coöperating locking mechanism will now be described. A guide box, 18, is supported in any convenient position in the cab of the locomotive, and a toothed segment, 19, is formed upon or secured to the rear end of the guide box. The hand reverse lever, 4, before mentioned, is fixed on a pin, 4$^a$, journaled in the base of the segment, in position for the lever to be swung throughout the length of the latter, and the pin, 4$^a$, carries an arm, 4$^b$, which is coupled by a rod, 23$^c$, to the rocker shaft of the actuating valve. A latch handle, 20, pivoted to the hand lever, 4, is coupled, by a link, 20$^a$, to a latch, 20$^b$, having teeth adapted to engage the teeth of the segment, 19, and is also coupled by a link, 20$^c$, which is longitudinally slotted at its lower end, to the rear arm of a double armed main latching lever, 21, which is pivoted, by a pin, 21$^a$, to the guide box, 18, and has a plurality of teeth formed on the upper side of its forward arm. The connections of the latch handle to the main latching lever and to the latch of the segment, are such that the disengagement of the former from the rack bar presently described, is effected before that of the segment latch from the teeth of the segment.

The rear end of the piston rod, 5$^a$, of the reversing cylinder is connected, either rigidly or pivotally as preferred, by the reach rod, 8$^a$, to a rack bar, 22, supported on a pinion, 27, in the guide box, 18, within which it is adapted to traverse longitudinally, being held against vertical movement by a cap plate, 18$^a$. The teeth of the rack bar are adapted to engage those of the main latching lever, 21, which is pressed upwardly, to effect such engagement, by a spring, 21$^b$, bearing on the guide box and on the lower side of the forward arm of the latching lever, 21.

A locking cylinder, 23, is formed on or secured to the cap plate, 18$^a$, of the guide box, and is fitted with a piston, 23$^a$, having downwardly projecting arms, 23$^b$, which extend on opposite sides of the main latching lever, and are pivotally connected thereto, by a pin, 23$^c$. The space within the locking cylinder, above the piston thereof, is connected, by a pipe, 24, with the casing, 25, of a three way valve mechanism, the details of which, as shown in Fig. 13, are as follows. The ends of the valve casing, 25, are connected, by pipes, 25$^a$, 25$^b$, with the opposite ends of the reversing cylinder, 3, and a ball valve, 26, fitted in the casing, between passages therein communicating with said pipes, opens or closes communication, as the case may be, between one or the other of said pipes and the pipe, 24, leading to the locking cylinder, which pipe opens into the valve casing intermediate of the connections of the pipes, 25$^a$, and 25$^b$, thereto.

The pinion, 27, the teeth of which engage the rack bar, 22, is fixed on a shaft, 27$^a$, journaled to rotate freely in bearings in the guide box, 18, and having a squared outwardly projecting wrist, 27$^b$, for the attachment of a crank, crank wheel, wrench, or other means for the application of manual power to effect the actuation of the reversing gear, in the event of such application becoming necessary at any time in the operation of the locomotive.

In the operation of a valve reversing gear of the construction substantially as above described, the gear being, as shown in the drawings, in middle positions, if it is desired to move the distribution valves of the locomotive into some position for forward movement, the hand lever, 4, in the cab is unlatched and moved forward, and, through the rod, 12°, moves the rocker shaft, 12, and actuating valve, 11, in the same directions. As soon as the left hand port, 11ª, of the actuating valve opens to the corresponding port, 13ᵇ, of the floating valve seat, motive fluid is admitted, through said ports and the left hand cylinder port, 3ᵇ, to the reversing cylinder, 3, on the rear side of the piston, 5, moving said piston to the right, and through the reach rod, 8, elevating the radius bar, 1°, in the link, 1. As the piston moves forward, it carries with it, through the cross head, 6, cam, 15, link, 16, and rocker shaft, 14, the floating valve seat, 11, the movement of the latter being in the same direction as the preceding movement of the actuating valve. This movement of the floating valve seat will cut off the supply of motive fluid to the reversing cylinder and arrest the movement of the piston and connected valve gear member, unless the movement of the actuating valve is continued by progressive movement of the hand lever in the cab.

The traverse of the actuating valve, independently of the floating valve seat, is limited by the length of the slot, 17ª, in the link, 17, which connects the rocker shafts of the valve and seat, and when this limit has been reached, the actuating valve can be moved forward only as fast as the floating valve seat is drawn forward by the cross head and connections. The slotted connecting link, together with the capability of giving the valve a larger opening in one direction than the other, by adjustment of the turnbuckle, enables perfect control to be effected. After the cab hand lever has been locked in any desired position, the piston continues to move, carrying with it the floating valve seat, until the left hand induction port is closed and the supply of motive fluid cut off from the cylinder. Movement of the reversing gear in either direction beyond the slight amount allowed by the lap of the valve, which is made as small as possible, is prevented, if there be a tendency on the part of the engine valve gear to pull the piston forward, by the uncovering of the forward port by the floating valve seat, as the piston moves forward, thereby admitting motive fluid to the forward side of the piston and returning it to normal position.

The application of the positive locking and hand reversing features of our invention, in connection with the power actuated reversing means proper, is of substantial advantage in preventing the creeping or slight vibratory movement of the gear due to the necessary lap of the actuating valve, and enabling the valve to be locked in lapped position, thereby eliminating all loss of motive fluid. The hand reversing attachment enables the engine to be reversed when "dead", or in the event of the loss of the supply of motive fluid. If these features are not applied, an ordinary hand lever, of the type of that shown, may be used.

In the operation of the locking mechanism, assuming, as before, the parts to be in middle gear position, and it is desired to move the distribution valves of the locomotive into a position for forward movement, the latch handle, 20, is pressed inward by grasping it and the hand lever, 4, thereby first lifting the end of the main latching lever, 21, and disengaging its teeth from those of the rack bar, and thereafter lifting the latch, 20ᵇ, and disengaging its teeth from those of the segment, 19. The hand lever is then moved forward, moving with it the actuating valve, 11, and thereby admitting motive fluid to the reversing cylinder, 3, on the rear side of the piston, 5, which moves said piston forwardly, as before described. The movement of the piston, by which the radius bar, 1°, is, through the reach rod, 8, and connected reverse shaft and arms, raised into forward gear with the link, 1, continues until the position of the hand lever shows that it has effected the desired adjustment of the valve gear. When the latch handle is released, the latch, 20ᵇ, engages the teeth of the segment, and thereby arrests further movement of the hand lever and of the actuating valve. Meanwhile, upon the admission of motive fluid to the reversing cylinder, it passes, through the pipe, 25ª, to the valve casing 25, and thence passes, through the pipe, 24, to the locking cylinder. Access of fluid to the forward end of the reversing cylinder, through the pipe, 25ᵇ, is prevented by the valve, 26, which automatically closes communication between said pipe and the valve casing, 25. The main latching lever, 21, has been forced downwardly, carrying with it the piston, 23ª, of the locking cylinder, by the manipulation of the latch handle, 20, and is held in its downward position, in which it is disengaged from the rack bar, by the pressure on the piston, 23ª, until the motive fluid is released from the locking cylinder by the return of the floating valve seat to its central position. It will thus be seen that after the movement of the actuating valve has been stopped by the release of the latch handle, 20, and the engagement of the latch, 20ᵇ, with the segment, the piston of the reversing cylinder will continue its movement until, by such movement, the floating valve seat has been caused to cut off communication with the fluid supply pipe to the reversing cylinder, and allow the release of fluid from the locking cylinder, upon which the main latching lever, 21, is moved into engagement with the rack bar, 22, by the spring, 21b. Such engagement is thereby prevented until the rack bar has come to rest, avoiding wear and tear of the teeth, and the valve will be automatically lapped, preventing waste of motive fluid.

We claim as our invention and desire to secure by Letters Patent:

1. In a valve reversing mechanism, the combination of a fluid pressure motor, an actuating valve governing the supply and exhaust of motive fluid to and from said motor, a hand lever for manually operating said valve, a floating valve seat interposed between the actuating valve and the ports of the motor, and having ports continuously communicating with said latter ports and controlled by the actuating valve, means for imparting movement to said valve seat by the motor, and connections coupling the actuating valve and the floating valve seat, with a limited degree of movement of the former relatively to the latter.

2. In a valve reversing mechanism, the combination of a fluid pressure motor, an actuating valve governing the supply and exhaust of motive fluid to and from said motor, a hand lever for manually operating said valve, a floating valve seat interposed between the actuating valve and the ports of the motor, and having ports continuously communicating with said latter ports and controlled by the actuating valve, means for moving said valve seat by the motor with a reduced degree of relative traverse, and connections coupling the actuating valve and the floating valve seat, with a limited degree of movement of the former relatively to the latter.

3. In a valve reversing mechanism, the combination of a fluid pressure motor, an actuating valve governing the supply and exhaust of motive fluid to and from said motor, a hand lever for manually operating said valve, a floating valve seat interposed between the actuating valve and the ports of the motor, and having ports continuously communicating with said latter ports, and controlled by the actuating valve, means for imparting movement to said valve seat by the motor, connections coupling the actuating valve and the floating valve seat, with a limited degree of movement of the former relatively to the latter, and means for adjusting said connections to vary the degree of relative movement.

4. In a valve reversing mechanism, the combination of a fluid pressure motor, an actuating valve governing the supply and exhaust of motive fluid to and from said motor, a hand lever for manually operating said valve, a floating valve seat interposed between the actuating valve and the ports of the motor and having ports continuously communicating with said latter ports and controlled by the actuating valve, a pivoted cam lever having a slotted arm actuated by the motor, connections coupling said cam lever to the floating valve seat, and connections coupling the actuating valve and the floating valve seat, with a limited degree of movement of the former relatively to the latter.

5. In a valve reversing mechanism, the combination of a fluid pressure reversing cylinder, a piston fitting therein, a piston rod fixed to said piston, a cross head thereon, a valve chest connected to the reversing cylinder, a fluid pressure supply pipe leading thereinto, an actuating valve fitted to reciprocate in said chest and govern the supply and exhaust ports of the reversing cylinder, a floating valve seat interposed between the actuating valve and the ports of the motor and having ports continuously communicating with said latter ports and controlled by the actuating valve, rocker shafts journaled in the valve chest and having arms therein coupled to the actuating valve and the floating valve seat, respectively, and arms outside the valve chest, reducing mechanism connections coupling the outer arm of the floating valve seat rocker shaft and the cross head, a longitudinally slotted link, coupling said arm and the outer arm of the actuating valve rocker shaft, a hand reverse lever, and a reach rod coupling said lever and the outer arm of the actuating valve rocker shaft.

6. In a valve reversing mechanism, the combination of a fluid pressure reversing motor, connections coupling said motor to a valve reverse shaft, a manually operable actuating valve controlling the supply and exhaust of motive fluid to and from said motor, a locking mechanism connected to said motor, a spring normally holding said mechanism in locked position, and manually operable means for releasing the pressure of said spring.

7. In a valve reversing mechanism, the combination of a fluid pressure reversing motor, connections coupling said motor to a valve reverse shaft, an actuating valve controlling the supply and exhaust of motive fluid to and from said motor, a hand reverse lever for operating said actuating valve, a locking mechanism connected to said motor, a spring normally holding said mechanism in locked position, manually operable means for releasing the pressure of said spring and means, actuated by pressure from the motor, for maintaining the locking mechanism in unlocked position during the operation of the motor.

8. In a valve reversing mechanism, the combination of a fluid pressure reversing motor, connections coupling said motor to a valve reverse shaft, an actuating valve controlling the supply and exhaust of motive fluid to and from said motor, a hand reverse lever for operating said actuating valve, a fixed segment, a latch handle and latch for holding the reverse lever in desired position on said segment, a rack bar connected to and movable by the motor, a main latching lever adapted to engage said rack bar, a link connected to and movable by the latch handle of the hand reverse lever, and coupled to the main latching lever, means for preventing the engagement of the main latching lever and rack bar during the movement of the motor, and means for causing the engagement of said lever and bar upon the cessation of the movement of the motor.

9. In a valve reversing mechanism, the combination of a fluid pressure reversing motor, connections coupling said motor to a valve reverse shaft, an actuating valve controlling the supply and exhaust of motive fluid to and from said motor, a hand reverse lever for operating said actuating valve, a fixed segment, a latch handle and latch for holding the reverse lever in desired position on said segment, a rack bar connected to and movable by the motor, a main latching lever adapted to engage said rack bar, a link connected to and movable by the latch handle of the hand reverse lever, and coupled to the main latching lever, a locking cylinder, a piston fitting therein and coupled to said lever, said piston, when under pressure, holding the main latching lever out of engagement with the rack bar, an automatically operable three way valve controlling communication between the locking cylinder and opposite ends of the cylinder of the reversing motor, and a spring bearing on the main latching lever in direction to effect its engagement with the rack bar upon the release of pressure from the locking cylinder.

10. In a valve reversing mechanism, the combination of a fluid pressure reversing motor, connections coupling said motor to a valve reverse shaft, an actuating valve controlling the supply and exhaust of motive fluid to and from said motor, a hand reverse lever for operating said actuating valve, a fixed segment, a latch handle and latch for holding the reverse lever in desired position on said segment, a rack bar connected to and movable by the motor, a main latching lever adapted to engage said rack bar, a link connected to and movable by the latch handle of the hand reverse lever, and coupled to the main latching lever, means for preventing the engagement of the main latching lever and rack bar during the movement of the motor, means for causing the engagement of said lever and bar upon the cessation of the movement of the motor, a manually operable shaft journaled below the rack bar, and a pinion fixed on said shaft and engaging the rack bar.

HAL R. STAFFORD,
ROBT. RENNIE.

Witnesses as to Hal R. Stafford:
J. SNOWDEN BELL,
EDW'D A. WRIGHT.

Witnesses as to Robert Rennie:
WILLIAM SEMPLE,
O. C. MYERS.